US012696036B2

(12) United States Patent
Chen et al.

(10) Patent No.: US 12,696,036 B2
(45) Date of Patent: Jul. 28, 2026

(54) HOWLING SUPPRESSION METHOD, HEARING AID, AND STORAGE MEDIUM

(71) Applicant: Shenzhen Eartech Co., Ltd., Shenzhen (CN)

(72) Inventors: Fei Chen, Shenzhen (CN); Jun-Yu Ji, Shenzhen (CN)

(73) Assignee: Shenzhen Eartech Co., Ltd., Shenzhen (CN)

( * ) Notice: Subject to any disclaimer, the term of this patent is extended or adjusted under 35 U.S.C. 154(b) by 395 days.

(21) Appl. No.: 18/277,929

(22) PCT Filed: Jan. 25, 2022

(86) PCT No.: PCT/CN2022/073870
§ 371 (c)(1),
(2) Date: Aug. 18, 2023

(87) PCT Pub. No.: WO2022/174727
PCT Pub. Date: Aug. 25, 2022

(65) Prior Publication Data

US 2024/0137713 A1 Apr. 25, 2024
US 2024/0236586 A9 Jul. 11, 2024

(30) Foreign Application Priority Data

Feb. 20, 2021 (CN) ........................ 202110191088.X

(51) Int. Cl.
*H04R 25/00* (2006.01)

(52) U.S. Cl.
CPC .................................. *H04R 25/453* (2013.01)

(58) Field of Classification Search
CPC ....... G10L 19/018; G10L 25/18; G10L 25/21; G10L 25/51; G10L 25/84; G10L 25/90; G10L 21/0208; G10L 2021/02082; G10L 21/0232; A61B 5/38; H04R 25/43; H04R 25/554; H04R 2225/43; H04R 2225/59; H04R 2225/41; H04R 2225/55; H04R 2225/61; H04R 3/04; H04R 3/02;
(Continued)

(56) References Cited

U.S. PATENT DOCUMENTS 6,125,187 A 9/2000 Hanajima et al.
9,805,709 B2 * 10/2017 Liu .......................... H04R 3/02
(Continued)

FOREIGN PATENT DOCUMENTS

CN 109451398 3/2019
CN 109637552 4/2019
(Continued)

*Primary Examiner* — Carolyn R Edwards
*Assistant Examiner* — Julie X Dang
(74) *Attorney, Agent, or Firm* — ScienBiziP, P.C.

(57) ABSTRACT

The present disclosure relates to a howling suppression method. The method includes obtaining audio data and obtaining a first sub-band signal of frame signal in the audio data. The method further includes obtaining a second sub-band signal of the first howling sub-band signal according to the first howling sub-band signal in response that the first sub-band signal is the first howling sub-band signal, and suppressing the howling frame signal in response that the second sub-band signal is the second howling sub-band signal and in response that the frame signal is the howling frame signal.

17 Claims, 5 Drawing Sheets

(58) Field of Classification Search
CPC ................ H04R 2430/03; H04R 27/00; G10K 11/17823; G10K 11/17854; G10K 11/17881; G10K 11/17825; G10K 2210/3026; G10K 2210/1081; G10K 2210/3027; G10K 2210/3038; G10K 2210/3028; G10K 2210/3056; G10K 2210/3044; H03G 3/3005
See application file for complete search history.

(56) References Cited

U.S. PATENT DOCUMENTS

| | | | | |
|---|---|---|---|---|
| 11,240,601 | B1 * | 2/2022 | Saplakoglu | H03G 3/344 |
| 2003/0012388 | A1 * | 1/2003 | Ura | H04R 3/02 381/66 |
| 2006/0215851 | A1 | 9/2006 | Troxel | |
| 2011/0182439 | A1 * | 7/2011 | Sakurada | H04R 3/02 381/94.1 |
| 2015/0104039 | A1 * | 4/2015 | Lee | G10L 21/0208 381/93 |

FOREIGN PATENT DOCUMENTS

| | | | | |
|---|---|---|---|---|
| CN | 110536215 | | 12/2019 | |
| CN | 110611871 | | 12/2019 | |
| CN | 110611871 | A * | 12/2019 | H04R 25/453 |
| CN | 110838301 | | 2/2020 | |
| CN | 110913306 | | 3/2020 | |
| CN | 112565981 | | 3/2021 | |

* cited by examiner

HOWLING SUPPRESSION METHOD, HEARING AID, AND STORAGE MEDIUM

The present application claims the benefit of and priority to Chinese Application with an application number 202110191088.X, filed on Feb. 20, 2021, entitled "HOWLING SUPPRESSION METHOD AND APPARATUS, HEARING AID, AND STORAGE MEDIUM" the content of which is hereby fully incorporated herein by reference for all purposes.

FIELD

The present disclosure relates to a technical field of digital signal processing, and in particular to a howling suppression method and apparatus, hearing aid and storage medium.

BACKGROUND

Due to high integration and small size of a digital hearing aid, a distance between a microphone and a speaker provided in the digital hearing aid is very small. Sound signal output from the speaker can easily leak through a gap between an earbud of the digital hearing aid and an ear canal of a user or a vent hole of the hearing aid. The leaked signal is received by the microphone, and the output from the speaker will form a positive feedback, forming a closed feedback loop, which is acoustic feedback phenomenon. The presence of the phenomenon of acoustic feedback can affect the performance of the hearing aid, impair sound quality and limit gain achievable with the hearing aid. When the gain of an entire system of the digital hearing aid is too large and meets a certain phase condition, it will cause instability of the entire system of the digital hearing aid and generate howling phenomenon.

An early method for controlling the acoustic feedback is phase modulation method. The phase modulation method can suppress the howling sound by changing phase condition enables the creating the howling sound by shifting frequency or phase of the sound signal before it is transmitted to the speaker. But this method tends to distort the sound signal. Room impulse response modeling methods include an adaptive filtering method and an adaptive inverse filtering method, the adaptive filtering method being a widely used method. However, due to a correlation between input signal and output signal of the system, the adaptive filtering method may lead to a deviation in the estimation of the feedback path by the system, which in turn may weaken effect of feedback suppression. There are two commonly used gain control methods, which are automatic gain control method and notch method. The automatic gain control method reduces the gain of whole frequency band, and the notch method reduces the gain at the whistling frequency by designing a notch filter. The notch method suppresses the howling sound after the hearing aid generates the howling sound, so it is necessary to first detect whether the howling sound has been generated, and then suppress the howling. A reliability of the notch method largely depends on an accuracy and timeliness of howling sound detection. Most of the howling sound detection methods require Fourier Transformation (FFT) to convert signal from a time domain into a frequency domain, and then judge and detect features of the howling sound. However, the inventor of the present disclosure realized that when the number of FFT points increases, the butterfly operation unit required for the FFT will also increase, and each butterfly operation unit requires two complex multiplications and two complex additions, which may consume too much resources. Moreover, the determination accuracy of frequency points of the howling sound is low, and the sound quality is further decreased.

The above content is only used to assist in understanding the technical solution of the present disclosure, and does not mean acknowledging that the above content is prior art.

SUMMARY

In view of the above, it is necessary to provide a howling suppression method, an apparatus, a hearing aid and a storage medium, which can solve the technical problems of low accuracy of howling frequency point detection in the prior art and damage to sound quality caused by howling suppression.

The first aspect of the present disclosure provides a howling suppression method, the howling suppression method comprising: obtaining audio data; obtaining a first sub-band signal of frame signal in the audio data according to the audio data; determining whether the first sub-band signal is a first howling sub-band signal; in response that the first sub-band signal is the first howling sub-band signal, obtaining a second sub-band signal of the first howling sub-band signal according to the first howling sub-band signal; determining whether the second sub-band signal is a second howling sub-band signal; in response that the second sub-band signal is the second howling sub-band signal, determining whether the frame signal is a howling frame signal according to the second howling sub-band signal; and suppressing the howling frame signal in response that the frame signal is a howling frame signal.

A second aspect of the present disclosure provides a hearing aid comprising: a storage device and a processor, the processor executing at least one computer-readable instruction stored in the storage device to implement following functions: obtaining audio data; obtaining a first sub-band signal of frame signal in the audio data according to the audio data; determining whether the first sub-band signal is a first howling sub-band signal; in response that the first sub-band signal is the first howling sub-band signal, obtaining a second sub-band signal of the first howling sub-band signal according to the first howling sub-band signal; determining whether the second sub-band signal is a second howling sub-band signal; in response that the second sub-band signal is the second howling sub-band signal, determining whether the frame signal is a howling frame signal according to the second howling sub-band signal; and suppressing the howling frame signal in response that the frame signal is a howling frame signal.

A third aspect of the present disclosure provides A non-transitory storage medium having at least one computer-readable instruction stored thereon, and the at least one computer-readable instruction being executed by a processor, to implement following functions: obtaining audio data; obtaining a first sub-band signal of frame signal in the audio data according to the audio data; determining whether the first sub-band signal is a first howling sub-band signal; in response that the first sub-band signal is the first howling sub-band signal, obtaining a second sub-band signal of the first howling sub-band signal according to the first howling sub-band signal; determining whether the second sub-band signal is a second howling sub-band signal; in response that the second sub-band signal is the second howling sub-band signal, determining whether the frame signal is a howling frame signal according to the second howling sub-band signal; and suppressing the howling frame signal in response that the frame signal is a howling frame signal.

It can be seen from the above technical solutions that the present disclosure obtains the audio data, and obtains the first sub-band signal of the frame signal in the audio data according to the audio data. Whether the first sub-band signal is the first howling sub-band signal is determined, and if the first sub-band signal is the first howling sub-band signal, a second sub-band signal of the first howling sub-band signal according to the first howling sub-band signal is obtained. Whether the second sub-band signal is a second howling sub-band signal is determined; in response to the second sub-band signal being the second howling sub-band signal, whether the frame information is a howling frame according to the second howling sub-band signal is determined; and in response to the frame signal being a howling frame signal, the howling frame signal is suppressed. Through the above method, the audio data is divided into multiple first sub-band signals according to the frequency, and the first sub-band signal whose energy value exceeds the preset energy value is divided into several second sub-band signals, and the second sub-band signal with the largest energy value is determined, and whether the energy ratio of the second sub-band signal with the largest energy value exceeds the preset ratio. If an energy ratio of a second sub-band signal is greater than the preset ratio in the signal of three consecutive frames or more, it is determined that the howling phenomenon existing. So that the howling frequency point can be accurately found and suppressed, only suppressing the second howling sub-band signal can suppress the howling phenomenon while reducing damage to sound quality.

The realization, functional features and advantages of the present disclosure will be further described in conjunction with the embodiments and with reference to the accompanying drawings.

DETAILED DESCRIPTION

It should be understood that the specific embodiments described herein are only used to explain the present disclosure, not to limit the present disclosure.

Figure 1:
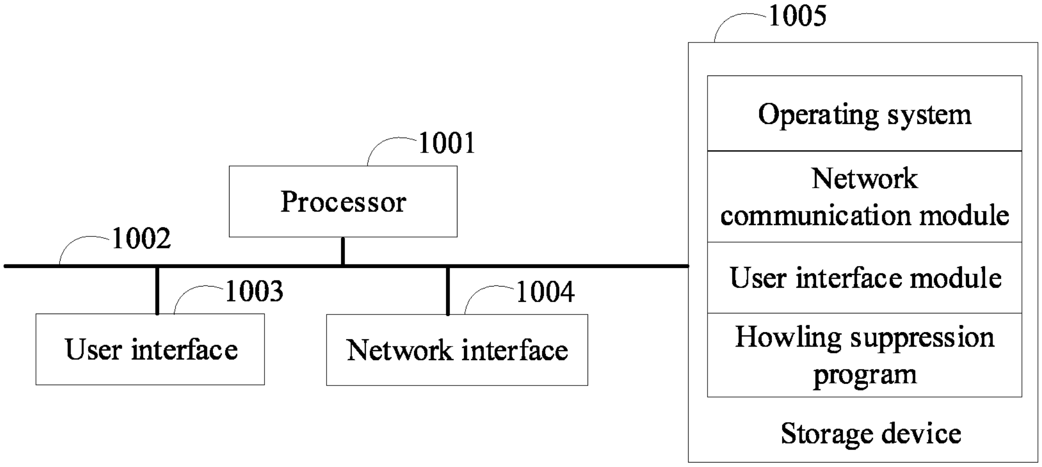
FIG. 1 is a schematic structural diagram of a hearing aid in a hardware operating environment according to an embodiment of the present disclosure.

Referring to FIG. 1, FIG. 1 is a schematic structural diagram of a hearing aid in a hardware operating environment of an embodiment of the present disclosure.

As shown in FIG. 1, the hearing aid may include a processor 1001, such as a central processing unit (CPU), a communication bus 1002, a user interface 1003, a network interface 1004, a storage device 1005. The communication bus 1002 is used to realize connection and communication between these components. The user interface 1003 may include a display screen (Display), and an input unit such as a keyboard. The user interface 1003 may also include a standard wired interface and a wireless interface. The network interface 1004 may optionally include a standard wired interface and a wireless interface (such as a wireless fidelity interface). The storage device 1005 may be a high-speed random access memory (RAM) memory, or a stable non-volatile memory (NVM), such as a disk memory. Optionally, the storage device 1005 may also be a storage device independent of the processor 1001.

Those skilled in the art can understand that the structure shown in FIG. 1 is not limited to the hearing aid, and may include more or less components than shown in the FIG. 1, or combine some components, or arrange different components.

As shown in FIG. 1, the storage device 1005 as a storage medium may include an operating system, a network communication module, a user interface module, and a howling suppression program.

In the hearing aid shown in FIG. 1, the network interface 1004 is mainly used for data communication with a network server, and the user interface 1003 is mainly used for data interaction with a user. The processor 1001 and the storage device 1005 in the hearing aid of the present disclosure can be set in the hearing aid, and the hearing aid invokes a howling suppression program stored in the storage device 1005 through the processor 1001 and executes the howling suppression method provided by the embodiment of the present disclosure.

Figure 2:
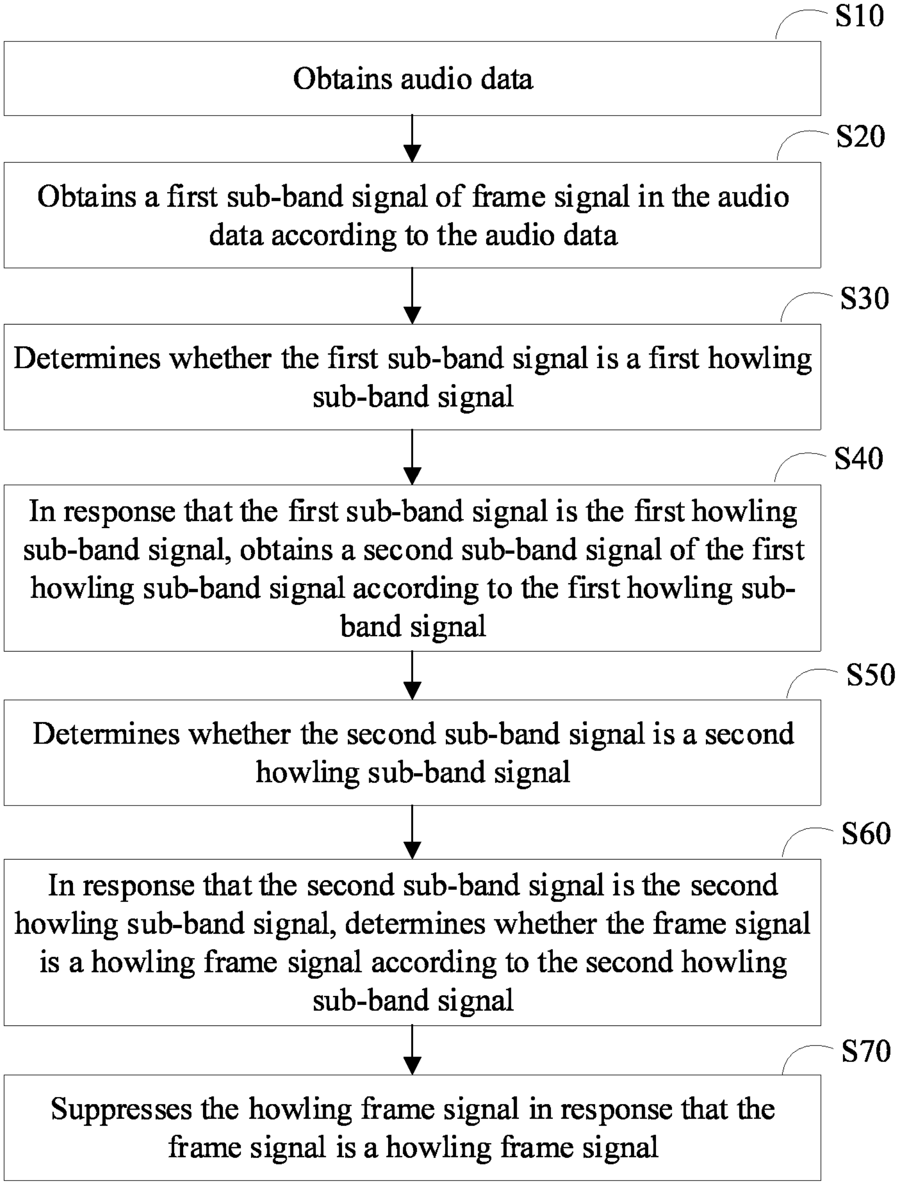
FIG. 2 is a schematic flowchart of a first embodiment of howling suppression method disclosed in the present disclosure.

The present disclosure provides a howling suppression method, referring to FIG. 2. FIG. 2 is a schematic flowchart of a first embodiment of a howling suppression method according to the present disclosure.

In one embodiment, the howling suppression method includes the following blocks:

Block S10, obtaining audio data.

Figure 3:
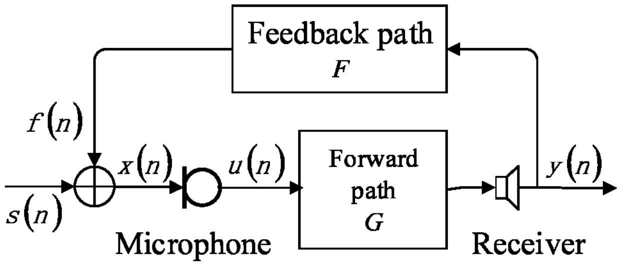
FIG. 3 is a schematic diagram of acoustic feedback generated by a hearing aid according to an embodiment of the howling suppression method in FIG. 2.

In one embodiment, it should be noted that an executive body of the embodiment can be a hearing aid, and the hearing aid can be a digital hearing aid. The hearing aid is a small loudspeaker, which amplifies sound that cannot be heard originally by people with hearing loss, and then uses residual hearing of the people with hearing loss to make the sound being sent to an auditory center of a brain of the people with hearing loss to feel the sound. The principle of howling produced by the hearing aid is shown in FIG. 3. Some of sound energy of a receiver of the hearing aid is transmitted to the microphone through sound propagation, causing the howling phenomenon.

It can be understood that, after the sound collected by the microphone of the hearing aid is sampled and quantized by an analog-to-digital converter, discrete digital signal is obtained, and the discrete digital signal is the audio data.

Block S20, obtaining a first sub-band signal of frame signal in the audio data according to the audio data.

Further, the block S20 includes obtaining an audio sampling rate according to the audio data, obtaining frame information according to the audio sampling rate, obtaining frequency information according to the audio data, dividing the audio data into audio signals of different preset frequency ranges according to the frequency information, obtaining a first sub-band signal set by assigning each of the audio signals of different preset frequency ranges to corresponding first channel, and obtaining the first sub-band signal of the frame signal according to the frame information and the first sub-band signal set.

It should be noted that the audio sampling rate refers to number of times a recording device samples the sound within one second. The higher the sampling frequency, the more realistic and natural the sound reproduction will be. On today's mainstream acquisition cards, a sampling frequency of the acquisition cards is generally divided into five levels, which are 11025 Hz, 22050 Hz, 24000 Hz, 44100 Hz, and 48000 Hz. The audio data with a sampling frequency of 11025 Hz contains 11025 sampling points in one second.

It should be noted that the frame information includes the time information of each frame. For example, when decoding Advanced Audio Coding (AAC) with a sampling rate of 44100 Hz, it usually takes 1024 sampling points as a frame, so the time of one frame is within 23.22 milliseconds, and the frame information varies according to different sampling rates, which is not limited in this embodiment.

It can be understood that the frequency information includes the sound wave frequency of the acquired audio data, the first channel refers to a sound input line, and one sound input line refers to one channel.

Figure 4:
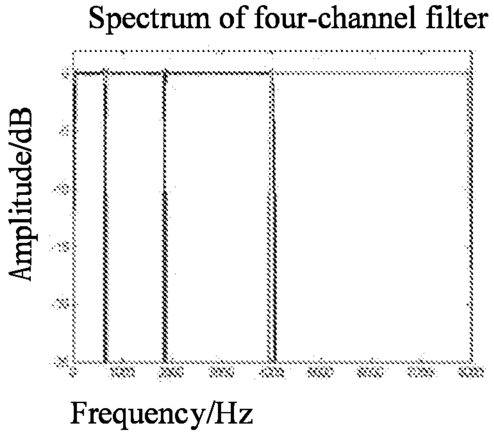
FIG. 4 is a schematic diagram of a filter spectrum of the howling sound suppression method in FIG. 2.

It should be noted that, according to multiple preset sound wave frequency ranges, the audio data is divided into audio signals of different sound wave frequency ranges and assigned each of the audio signals to the corresponding first channel. That is, the audio data is divided into the audio signals of different sound wave frequency ranges through a first-stage filter group to obtain the first sub-band signal set. The first-stage filter group includes multiple first channels of preset frequency ranges. According to the frame information, the first set of sub-band signals within a frame time, that is, frame signal, can be obtained. For example, as shown in FIG. 4, based on auditory characteristics of human ear, audio data with a sound wave frequency range from 50 Hz to 8000 Hz can be divided into multiple channels. Since perception of sound frequencies by the human cochlea is not equidistant, in the cochlear structure, the low frequency band is divided with a narrow range, and the high frequency band is divided with a wide range, so the preset frequency range is not evenly distributed. The preset frequency ranges can include a range of 50 Hz~600 Hz, a range of 601 Hz~1800 Hz, a range of 1801 Hz~4000 Hz, and a range of 4001 Hz~8000 Hz, and the audio data corresponding to the sound wave frequency is divided into four groups of audio signals, the first sub-band signal set including the four groups of the audio signals is obtained. And a period occupied by the frame signal is 23.22 milliseconds, then the first sub-band signal set within 23.22 milliseconds is the frame signal, and the audio signal of each first channel is the first sub-band signal. The described above are examples only and are not limited in this embodiment.

It can be understood that the frame signal is collected in real time, and every time the audio data of one frame is collected, the audio data of one frame is assigned to a channel. Then the audio data can be processed in real-time.

Block S30, determining whether the first sub-band signal is a first howling sub-band signal.

Further, block S30 includes obtaining an energy value of the first sub-band signal according to the first sub-band signal of the frame signal, and determining whether the first sub-band signal is a first howling sub-band signal by comparing the energy value of the first sub-band signal with a preset energy threshold.

It should be noted that the energy value of the first sub-band signal refers to a logarithm of an energy of the first sub-band signal, and a formula for calculating the energy is as follows:

$$E_i = \sum_{i=1}^{N} x_i^2(n)$$

formula one;

Wherein, $x_i(n)$ represents a signal value of the i-th first sub-band in the n-th frame signal of the first-stage filter group, i∈(0, 1, 2, 3 . . . , L), N∈(0, 1, 2 . . . , N), L is a signal length, and N represents an order of a current frame information.

A formula for calculating the logarithm of the energy is as follows:

$$\log\_E_i = \log_2(E_i) \qquad \text{formula two;}$$

Wherein, $\log\_E_i$ represents the energy value of the i-th first sub-band signal.

It can be understood that compared $\log\_E_i$ r with the preset energy value, and in response that the $\log\_E_i$ r being greater than the preset energy value, it is determined that the first sub-band signal is the first howling sub-band signal. In response that the $\log\_E_i$ r being equal to or less than the preset energy value, it is determined that the first sub-band signal is not the first howling sub-band signal. If all the first sub-band signals are not the first howling sub-band signal, it is determined that there is no howling phenomenon.

Block S40, in response that the first sub-band signal is the first howling sub-band signal, obtaining a second sub-band signal of the first howling sub-band signal according to the first howling sub-band signal.

Further, block S40 includes in response that the first sub-band signal is the first howling sub-band signal, dividing the first howling sub-band signal into first howling sub-band signals of different preset howling frequency ranges, obtaining a second sub-band signal set by assigning each of the first howling sub-band signals of different preset howling frequency ranges to corresponding second channel, and obtaining second sub-band signals according to the second sub-band signal set.

It should be noted that when the first sub-band signal of the frame signal is the first howling sub-band signal, it is necessary to divide the first howling sub-band signal into a second sub-band signal with a narrower frequency band. That is, the preset howling frequency range is smaller than the preset frequency range mentioned above. For example, the frequency range of the first howling sub-band signal is 50 Hz~600 Hz, dividing the frequency range 50 Hz~600 Hz into a range of 50 Hz~200 Hz, a range of 201 Hz~400 Hz, and a range of 401 Hz~600 Hz, and assigning the first howling sub-band signal to the corresponding second channel through the second-stage filter group, and obtaining the second sub-band signal set includes three sets of second sub-band signals. That is, three sets of second sub-band signals can be obtained from the second sub-band signal set. The above is only an example, and this implementation examples are not limited.

Block S50, determining whether the second sub-band signal is a second howling sub-band signal.

Further, block S50 includes according to the second sub-band signal, obtaining an energy value of the second sub-band signal, and obtaining a target second sub-band signal with the largest energy value, obtaining two energy values of two second sub-band signals adjacent to the target second sub-band signal, calculating an energy ratio among the two adjacent second sub-band signals and the target second sub-band signal according to the energy value of the target second sub-band signal and the two energy values of the two adjacent second sub-band signals, and determining whether the target second sub-band signal is the second howling sub-band signal by comparing the energy ratio with a preset energy ratio.

It should be noted that, according to the above formula one and formula two, the energy value of each second sub-band signal can be obtained, and the second sub-band signal with the largest energy value, that is, the target second sub-band signal can be obtained.

It can be understood that the energy values of the second sub-band signals adjacent to the target second sub-band signal before and after are obtained, and the energy ratio is calculated. The formulas for calculating the ratios are as following formular three and formula four:

$$\text{Ratel1} = \frac{\log 2 - E_{p,q}}{\log 2 - E_{p,q-1}}, \qquad \text{formula three}$$

$$\text{Ratel2} = \frac{\log - E_{p,q}}{\log - E_{p,q+1}}, \qquad \text{formula four}$$

wherein, p indicates that the p-th first sub-band signal in the frame information is the first howling sub-band signal. q indicates that the q-th second sub-band signal in the first howling sub-band signal is the target sub-band signal. Rate1 and Rate2 represent energy ratios between the target second sub-band signal and two adjacent second sub-band signals.

It can be understood that in response to both Rate1 and Rate2 are greater than the preset energy ratio, it indicates that the target second sub-band signal is the second howling sub-band signal.

Block S60, in response that the second sub-band signal is the second howling sub-band signal, determining whether the frame signal is a howling frame signal according to the second howling sub-band signal.

Further, block S60 includes determining that the target second sub-band signal is the second howling sub-band signal in response to the energy ratio being greater than the preset energy ratio, obtaining a marked frame signal by marking the second howling sub-band signal, and determining whether the frame signal is the howling frame signal according to the marked frame signal.

It should be noted that if the energy ratio is greater than the preset energy ratio, the target second sub-band signal is the second howling sub-band signal, and the second howling sub-band signal may cause the howling phenomenon, so there is a need to mark the second howling sub-band signal, and the frame signal where the second howling sub-band signal located is also marked as the marked frame signal.

It should be understood that when more than three consecutive frames of frame signals are marked frame signals, it means that there is a howling phenomenon existing. When more than three consecutive frames of the marked frame signals are howling frame signals, it is necessary to suppress the howling frame signals to achieve the effect of reducing the howling phenomenon.

Block S70, suppressing the howling frame signal in response that the frame signal is a howling frame signal.

Further, block S70 includes if the frame signal is a howling frame signal, in order to suppress the howling frame signal, obtaining a second howling suppression sub-band signal by setting the second howling sub-band signal of the howling frame signal as a preset value. After suppressing the howling frame signal, the method further includes obtaining the first howling suppression sub-band signal by combining the second howling suppression sub-band signal with other second sub-band signals and obtaining howling suppression audio data by combining the first howling suppression sub-band signal with other first sub-band signals.

It can be understood that a howling frequency point of the howling frame signal should be in the second howling sub-band signal, so reducing the howling phenomenon needs to process the second howling sub-band signal. For example, directly setting the second howling sub-band signal as zero. On one hand, by setting the second howling sub-band signal as zero can minimize a computational complexity of howling suppression. And as frequency band of the second-stage filter group is narrow, by setting the second howling sub-band signal as zero can suppress the howling phenomenon and reduce damage to sound quality.

Figure 5:
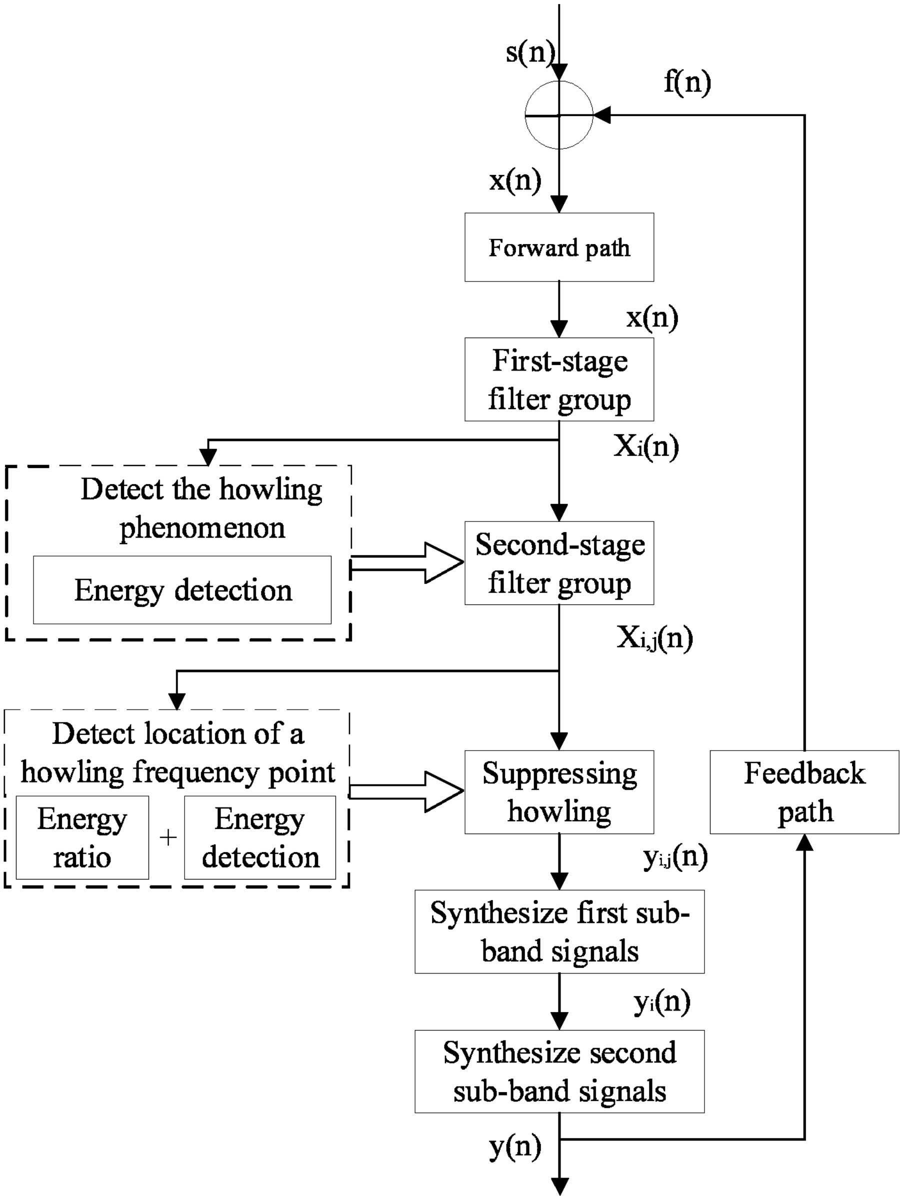
FIG. 5 is a schematic diagram of a howling suppression principle of the howling suppression method in FIG. 2.

It should be understood that after the howling frequency point is eliminated, the second sub-band signals need to be synthesized to obtain the first howling suppression sub-band signal. The first howling suppression sub-band signal is synthesized with each of the first sub-band signals, and the howling suppression audio data can be obtained so that the hearing aid can play audio data normally without existing howling phenomenon. The schematic diagram of the howling suppression method is shown in FIG. 5. The audio data is passed through the first-stage filter group to obtain a set including several first sub-band signals, and the set of first sub-band signals is divided into several frame signals according to the frame information. Howling phenomenon detection is performed on the first sub-band signal of the frame signal, which is used to initially detect whether there is a howling phenomenon. If the detection result shows that there is howling phenomenon, then dividing the first sub-band signal with howling phenomenon into multiple second sub-band signals with a narrower frequency band by a second-stage filter group. More accurate results can be obtained by performing secondary howling detection on the second sub-band signal. If the second detection result shows that there is a howling phenomenon, the howling phenomenon will be suppressed. All sub-band signals are synthesized into playable audio data after suppressing the howling phenomenon.

In one embodiment, audio data is obtained, and the first sub-band signal of the frame signal in the audio data is obtained according to the audio data. Whether the first sub-band signal is the first howling sub-band signal is determined, and if the first sub-band signal is the first howling sub-band signal, a second sub-band signal of the first howling sub-band signal according to the first howling sub-band signal is obtained. Whether the second sub-band signal is a second howling sub-band signal is determined; in response to the second sub-band signal being the second howling sub-band signal, whether the frame information is a howling frame according to the second howling sub-band signal is determined; and in response to the frame signal being a howling frame signal, the howling frame signal is suppressed. Through the above method, the audio data is divided into multiple first sub-band signals according to the frequency, and the first sub-band signal whose energy value exceeds the preset energy value is divided into several second sub-band signals, and the second sub-band signal with the largest energy value is determined, and whether the energy ratio of the second sub-band signal with the largest energy value exceeds the preset ratio. If an energy ratio of a second sub-band signal is greater than the preset ratio in the signal of three consecutive frames or more, it is determined that there is howling phenomenon. So that the howling frequency point can be accurately found and suppressed, only suppressing the second howling sub-band signal can suppress the howling phenomenon while reducing damage to sound quality.

In addition, an embodiment of the present disclosure also supplies a storage medium, on which a howling suppression program is stored, and when the howling suppression program is executed by a processor, the blocks of the howling suppression method described above are implemented.

Figure 6:
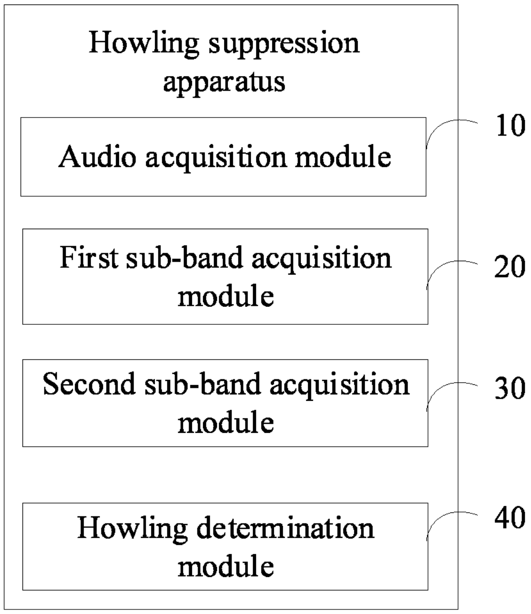
FIG. 6 is a structural block diagram of a first embodiment of a howling suppression apparatus of the present disclosure.

Referring to FIG. 6, FIG. 6 is a structural block diagram of a first embodiment of the howling suppression apparatus of the present disclosure.

As shown in FIG. 6, the howling suppression apparatus supplied by the embodiment of the present disclosure includes: An audio acquisition module 10 acquires the audio data.

A first sub-band acquisition module 20 obtains a first sub-band signal of frame signal in the audio data according to the audio data.

The first sub-band acquisition module 20 determines whether the first sub-band signal is a first howling sub-band signal.

A second sub-band acquisition module 30 obtains a second sub-band signal of the first howling sub-band signal according to the first howling sub-band signal in response that the first sub-band signal is the first howling sub-band signal.

The second sub-band acquisition module 30 further determines whether the second sub-band signal is a second howling sub-band signal.

A howling determination module 40 determines whether the frame information is a howling frame signal according to the second howling sub-band signal, in response that the second sub-band signal is the second howling sub-band signal.

The howling determination module 40 further suppresses the howling frame signal in response that the frame signal is a howling frame signal.

It should be understood that the above is only for illustration and does not constitute any limitation to the technical solution of the present disclosure. In a specific disclosure, those skilled in the art can make settings according to needs, and the present disclosure does not limit it.

In one embodiment, the audio data is obtained, and the first sub-band signal of the frame signal in the audio data is obtained according to the audio data. Whether the first sub-band signal is the first howling sub-band signal is determined, and if the first sub-band signal is the first howling sub-band signal, a second sub-band signal of the first howling sub-band signal according to the first howling sub-band signal is obtained. Whether the second sub-band signal is a second howling sub-band signal is determined; in response to the second sub-band signal being the second howling sub-band signal, whether the frame information is a howling frame according to the second howling sub-band signal is determined; and in response to the frame signal being a howling frame signal, the howling frame signal is suppressed. Through the above method, the audio data is divided into multiple first sub-band signals according to the frequency, and the first sub-band signal whose energy value exceeds the preset energy value is divided into several second sub-band signals, and the second sub-band signal with the largest energy value is determined, and whether the energy ratio of the second sub-band signal with the largest energy value exceeds the preset ratio. If an energy ratio of a second sub-band signal is greater than the preset ratio in the signal of three consecutive frames or more, it is determined that the howling phenomenon existing. So that the howling frequency point can be accurately found and suppressed, only suppressing the second howling sub-band signal can suppress the howling phenomenon while reducing damage to sound quality.

It should be noted that a workflow described above is only illustrative and does not limit the scope of protection of the present disclosure. In practical applications, those skilled in the art can select part or all of them to implement according to actual needs. The purpose of the scheme of this embodiment is not limited here.

In addition, for technical details not described in detail in this embodiment, reference may be made to the howling suppression method provided in any embodiment of the present disclosure, which will not be repeated here.

In an embodiment, the first sub-band acquisition module 20 further obtains an audio sampling rate according to the audio data, obtains the frame information according to the audio sampling rate, obtains frequency information according to the audio data, divides the audio data into audio signals of different preset frequency ranges according to the frequency information, obtains a first sub-band signal set by assigning each of the audio signals of different preset frequency ranges to corresponding first channel, and obtains the first sub-band signal of the frame signal according to the frame information and the first sub-band signal set.

In an embodiment, the first sub-band acquisition module 20 further determines an energy value of the first sub-band signal according to the first sub-band signal of the frame signal, and determines whether the first sub-band signal is a first howling sub-band signal by comparing the energy value of the first sub-band signal with a preset energy threshold.

In an embodiment, the second sub-band acquisition module 30 divides the first howling sub-band signal into first howling sub-band signals of different preset howling frequency ranges, obtains a second sub-band signal set by assigning each of the first howling sub-band signals of different preset howling frequency ranges to corresponding second channel, and obtains second sub-band signals according to the second sub-band signal set.

In an embodiment, the second sub-band acquisition module 30 further obtains an energy value of the second sub-band signal according to the second sub-band signal, and obtains a target second sub-band signal with the largest energy value, obtains two energy values of two second sub-band signals adjacent to the target second sub-band signal, determines an energy ratio of the two adjacent second sub-band signals and the target second sub-band signal according to the energy value of the target second sub-band signal and the two energy values of the two adjacent second sub-band signals, and determines whether the target second sub-band signal is the second howling sub-band signal by comparing the energy ratio with a preset energy ratio.

In an embodiment, the howling determination module 40 further determines that the target second sub-band signal is the second howling sub-band signal in response to the energy ratio being greater than the preset energy ratio, obtains a marked frame signal by marking the second howling sub-band signal, and determines whether the frame signal is the howling frame signal according to the marked frame signal.

In an embodiment, the howling determination module 40 further obtains a second howling suppression sub-band signal by setting the second howling sub-band signal of the howling frame signal as a preset value, in order to suppress the howling frame signal, if the frame signal is a howling frame signal. After suppressing the howling frame signal, the howling determination module 40 further obtains a first howling suppression sub-band signal by combining the second howling suppression sub-band signal with other second sub-band signals and obtains howling suppression audio data by combining the first howling suppression sub-band signal with other first sub-band signals.

Furthermore, it should be noted that in the present disclosure, the term "comprises", "include" or any other variation thereof is intended to cover a non-exclusive inclusion such that a process, method, article or system comprising a set of elements includes not only those elements, but also other elements not expressly listed, or elements inherent in such a process, method, article, or system. Without further limitations, an element defined by the phrase "comprising a . . . " does not preclude the presence of additional identical elements in the process, method, article or system comprising that element.

The serial numbers of the above-mentioned embodiments of the present disclosure are for description only, and do not represent the advantages and disadvantages of the embodiments.

Through the description of the above embodiments, those skilled in the art can clearly understand that the methods of the above embodiments can be implemented by means of software plus a necessary general-purpose hardware platform, and of course also by hardware, but in many cases the former is better implementation. Based on this understanding, the essence of the technical solution disclosed in this disclosure or the part that contributes to the prior art can be embodied in the form of a software product, and the computer software product is stored in a storage medium (such as a read-only memory (ROM)/RAM, magnetic disk, optical disk), including several instructions to enable a terminal device (which may be a mobile phone, a computer, a server, or a network device, etc.) to execute the methods described in various embodiments of the present disclosure.

The above are only preferred embodiments of this disclosure, and do not limit the scope of patents of this disclosure. Any equivalent structure or equivalent process transformation made by using this disclosure specification and accompanying drawings, or directly or indirectly used in other related technologies fields are all equally included in the scope of the technical solutions of the present application.

What is claimed is:

1. A howling suppression method, the method comprising:
- obtaining audio data;
- obtaining a first sub-band signal of a frame signal in the audio data according to the audio data;
- determining whether the first sub-band signal is a first howling sub-band signal, comprising: obtaining an energy value of the first sub-band signal according to the first sub-band signal of the frame signal, and comparing the energy value of the first sub-band signal with a preset energy threshold;
- in response that the first sub-band signal is the first howling sub-band signal, obtaining a second sub-band signal of the first howling sub-band signal according to the first howling sub-band signal;
- determining whether the second sub-band signal is a second howling sub-band signal;
- in response that the second sub-band signal is the second howling sub-band signal, determining whether the frame signal is a howling frame signal according to the second howling sub-band signal; and
- suppressing the howling frame signal in response that the frame signal is the howling frame signal.

2. The howling suppression method according to claim 1, wherein the obtaining the first sub-band signal of the frame signal in the audio data according to the audio data comprises:
- obtaining an audio sampling rate according to the audio data;
- obtaining frame information according to the audio sampling rate;
- obtaining frequency information according to the audio data;
- dividing the audio data into audio signals of different preset frequency ranges according to the frequency information;
- obtaining a first sub-band signal set by assigning each of the audio signals of different preset frequency ranges to corresponding first channel; and
- obtaining the first sub-band signal of the frame signal according to the frame information and the first sub-band signal set.

3. The howling suppression method according to claim 1, wherein in response that the first sub-band signal is the first howling sub-band signal, obtaining the second sub-band signal of the first howling sub-band signal according to the first howling sub-band signal comprises:
- in response that the first sub-band signal is the first howling sub-band signal, dividing the first howling sub-band signal into first howling sub-band signals of different preset howling frequency ranges;
- obtaining a second sub-band signal set by assigning each of the first howling sub-band signals of different preset howling frequency ranges to corresponding second channel; and
- obtaining second sub-band signals according to the second sub-band signal set.

4. The howling suppression method according to claim 1, wherein the determining whether the second sub-band signal is the second howling sub-band signal comprises:
- obtaining an energy value of the second sub-band signal according to the second sub-band signal and obtaining a target second sub-band signal with a largest energy value;
- obtaining two energy values of two second sub-band signals adjacent to the target second sub-band signal;
- calculating an energy ratio of two adjacent second sub-band signals and the target second sub-band signal according to the energy value of the target second sub-band signal and the two energy values of the two adjacent second sub-band signals; and
- determining whether the target second sub-band signal is the second howling sub-band signal by comparing the energy ratio with a preset energy ratio.

5. The howling suppression method according to claim 4, wherein in response that the second sub-band signal is the second howling sub-band signal, the determining whether the frame signal is the howling frame signal according to the second howling sub-band signal comprises:
- determining that the target second sub-band signal is the second howling sub-band signal in response to the energy ratio being greater than the preset energy ratio;
- obtain a marked frame signal by marking the second howling sub-band signal; and
- determining whether the frame signal is the howling frame signal according to the marked frame signal.

6. The howling suppression method according to claim 1, wherein the suppressing the howling frame signal in response that the frame signal is the howling frame signal comprises:

in response that the frame signal is the howling frame signal, obtaining a second howling suppression sub-band signal by setting the second howling sub-band signal of the howling frame signal as a preset value to suppress the howling frame signal;

obtaining the first howling suppression sub-band signal by combining the second howling suppression sub-band signal with other second sub-band signals; and obtaining howling suppression audio data by combining the first howling suppression sub-band signal with other first sub-band signals.

7. A howling suppression apparatus comprising:

an audio acquisition module, is configured to obtain audio data;

a first sub-band acquisition module, is configured to obtain a first sub-band signal of a frame signal in the audio data according to the audio data;

the first sub-band acquisition module, is further configured to determine whether the first sub-band signal is a first howling sub-band signal by obtaining an energy value of the first sub-band signal according to the first sub-band signal of the frame signal, and comparing the energy value of the first sub-band signal with a preset energy threshold;

a second sub-band acquisition module, is configured to obtain a second sub-band signal of the first howling sub-band signal according to the first howling sub-band signal in response that the first sub-band signal is the first howling sub-band signal;

the second sub-band acquisition module, is further configured to determine whether the second sub-band signal is a second howling sub-band signal;

a howling determination module, is configured to determine whether the frame signal is a howling frame signal according to the second howling sub-band signal in response that the second sub-band signal is the second howling sub-band signal; and the howling determination module, is further configured to suppress the howling frame signal in response that the frame signal is the howling frame signal.

8. A hearing aid comprising:

a storage device and a processor, the processor executing at least one computer-readable instruction stored in the storage device to implement following functions:

obtaining audio data;

obtaining a first sub-band signal of a frame signal in the audio data according to the audio data;

determining whether the first sub-band signal is a first howling sub-band signal, comprising: obtaining an energy value of the first sub-band signal according to the first sub-band signal of the frame signal, and comparing the energy value of the first sub-band signal with a preset energy threshold;

in response that the first sub-band signal is the first howling sub-band signal, obtaining a second sub-band signal of the first howling sub-band signal according to the first howling sub-band signal;

determining whether the second sub-band signal is a second howling sub-band signal;

in response that the second sub-band signal is the second howling sub-band signal, determining whether the frame signal is a howling frame signal according to the second howling sub-band signal; and suppressing the howling frame signal in response that the frame signal is the howling frame signal.

9. The hearing aid according to claim 8, wherein the obtaining the first sub-band signal of frame signal in the audio data according to the audio data, the processor executing at least one computer-readable instruction to implement following functions:

obtaining an audio sampling rate according to the audio data;

obtaining frame information according to the audio sampling rate;

obtaining frequency information according to the audio data;

dividing the audio data into audio signals of different preset frequency ranges according to the frequency information;

obtaining a first sub-band signal set by assigning each of the audio signals of different preset frequency ranges to corresponding first channel; and obtaining the first sub-band signal of the frame signal according to the frame information and the first sub-band signal set.

10. The hearing aid according to claim 8, wherein in response that the first sub-band signal is the first howling sub-band signal, the obtaining a second sub-band signal of the first howling sub-band signal according to the first howling sub-band signal, the processor executing at least one computer-readable instruction to implement following functions:

in response that the first sub-band signal is the first howling sub-band signal, dividing the first howling sub-band signal into first howling sub-band signals of different preset howling frequency ranges;

obtaining a second sub-band signal set by assigning each of the first howling sub-band signals of different preset howling frequency ranges to corresponding second channel; and obtaining second sub-band signals according to the second sub-band signal set.

11. The hearing aid according to claim 8, wherein the determining whether the second sub-band signal is the second howling sub-band signal, the processor executing at least one computer-readable instruction to implement following functions:

obtaining an energy value of the second sub-band signal according to the second sub-band signal and obtaining a target second sub-band signal with a largest energy value;

obtaining two energy values of two second sub-band signals adjacent to the target second sub-band signal;

calculating an energy ratio of two adjacent second sub-band signals and the target second sub-band signal according to the energy value of the target second sub-band signal and the two energy values of the two adjacent second sub-band signals; and determining whether the target second sub-band signal is the second howling sub-band signal by comparing the energy ratio with a preset energy ratio.

12. The hearing aid according to claim 11, wherein in response that the second sub-band signal is the second howling sub-band signal, determining whether the frame signal is a howling frame signal according to the second howling sub-band signal, the processor executing at least one computer-readable instruction to implement following functions:

determining that the target second sub-band signal is the second howling sub-band signal in response to the energy ratio being greater than the preset energy ratio;

obtain a marked frame signal by marking the second howling sub-band signal; and determining whether the frame signal is the howling frame signal according to the marked frame signal.

13. A non-transitory storage medium having at least one computer-readable instruction stored thereon, and the at least one computer-readable instruction being executed by a processor, to implement following functions:

obtaining audio data;

obtaining a first sub-band signal of a frame signal in the audio data according to the audio data;

determining whether the first sub-band signal is a first howling sub-band signal, comprising obtaining an energy value of the first sub-band signal according to the first sub-band signal of the frame signal, and comparing the energy value of the first sub-band signal with a preset energy threshold;

in response that the first sub-band signal is the first howling sub-band signal, obtaining a second sub-band signal of the first howling sub-band signal according to the first howling sub-band signal;

determining whether the second sub-band signal is a second howling sub-band signal;

in response that the second sub-band signal is the second howling sub-band signal, determining whether the frame signal is a howling frame signal according to the second howling sub-band signal; and suppressing the howling frame signal in response that the frame signal is the howling frame signal.

14. The non-transitory storage medium according to claim 13, wherein the obtaining the first sub-band signal of frame signal in the audio data according to the audio data, the processor executing at least one computer-readable instruction to implement following functions:

obtaining an audio sampling rate according to the audio data;

obtaining frame information according to the audio sampling rate;

obtaining frequency information according to the audio data;

dividing the audio data into audio signals of different preset frequency ranges according to the frequency information;

obtaining a first sub-band signal set by assigning each of the audio signals of different preset frequency ranges to corresponding first channel; and obtaining the first sub-band signal of the frame signal according to the frame information and the first sub-band signal set.

15. The non-transitory storage medium according to claim 13, wherein in response that the first sub-band signal is the first howling sub-band signal, the obtaining a second sub-band signal of the first howling sub-band signal according to the first howling sub-band signal, the processor executing at least one computer-readable instruction to implement following functions:

in response that the first sub-band signal is the first howling sub-band signal, dividing the first howling sub-band signal into first howling sub-band signals of different preset howling frequency ranges;

obtaining a second sub-band signal set by assigning each of the first howling sub-band signals of different preset howling frequency ranges to corresponding second channel; and obtaining second sub-band signals according to the second sub-band signal set.

16. The non-transitory storage medium according to claim 13, wherein the determining whether the second sub-band signal is the second howling sub-band signal, the processor executing at least one computer-readable instruction to implement following functions:

obtaining an energy value of the second sub-band signal according to the second sub-band signal and obtaining a target second sub-band signal with a largest energy value;

obtaining two energy values of two second sub-band signals adjacent to the target second sub-band signal;

calculating an energy ratio of two adjacent second sub-band signals and the target second sub-band signal according to the energy value of the target second sub-band signal and the two energy values of the two adjacent second sub-band signals; and determining whether the target second sub-band signal is the second howling sub-band signal by comparing the energy ratio with a preset energy ratio.

17. The non-transitory storage medium according to claim 16, wherein in response that the second sub-band signal is the second howling sub-band signal, determining whether the frame signal is a howling frame signal according to the second howling sub-band signal, the processor executing at least one computer-readable instruction to implement following functions:

determining that the target second sub-band signal is the second howling sub-band signal in response to the energy ratio being greater than the preset energy ratio;

obtain a marked frame signal by marking the second howling sub-band signal; and determining whether the frame signal is the howling frame signal according to the marked frame signal.

* * * * *